US010730542B1

(12) United States Patent
Guirlinger

(10) Patent No.: US 10,730,542 B1
(45) Date of Patent: Aug. 4, 2020

(54) UTILITY CART

(71) Applicant: Edward G. Guirlinger, New Albany, OH (US)

(72) Inventor: Edward G. Guirlinger, New Albany, OH (US)

( * ) Notice: Subject to any disclaimer, the term of this patent is extended or adjusted under 35 U.S.C. 154(b) by 0 days.

(21) Appl. No.: 16/242,676

(22) Filed: Jan. 8, 2019

(51) Int. Cl.
*B62B 5/00* (2006.01)
*B62B 5/06* (2006.01)
*B62B 1/26* (2006.01)
*B62B 1/24* (2006.01)

(52) U.S. Cl.
CPC ............... *B62B 5/06* (2013.01); *B62B 1/24* (2013.01); *B62B 1/262* (2013.01)

(58) Field of Classification Search
CPC .... B62B 1/10; B62B 1/20; B62B 1/24; B62B 1/14
See application file for complete search history.

(56) References Cited

U.S. PATENT DOCUMENTS

| | | | | |
|---|---|---|---|---|
| 5,758,886 A * | 6/1998 | Mayer | ............... | B62B 1/14 280/47.26 |
| 5,893,572 A * | 4/1999 | Parks | ............... | B25H 1/04 280/47.18 |
| 5,957,321 A * | 9/1999 | Jones | ............... | A01K 97/26 206/315.11 |
| 6,578,937 B1 * | 6/2003 | Thoman | ............... | A47B 87/0207 206/373 |
| 6,945,546 B2 * | 9/2005 | Guirlinger | ............... | B25H 3/00 280/35 |
| 7,883,096 B2 * | 2/2011 | Katz | ............... | B25H 3/02 206/373 |
| 8,146,722 B1 * | 4/2012 | Moreno | ............... | A45C 5/14 190/115 |
| 8,915,504 B1 * | 12/2014 | Seibert | ............... | B62B 1/10 280/47.16 |
| 9,132,543 B2 * | 9/2015 | Bar-Erez | ............... | B25H 3/023 |
| 9,943,956 B1 * | 4/2018 | Giamanco | ............... | B25H 5/00 |
| 2006/0197297 A1 * | 9/2006 | Humphries | ............... | B65F 1/006 280/47.26 |
| 2008/0054582 A1 * | 3/2008 | Thibault | ............... | B25H 3/00 280/47.35 |
| 2009/0301913 A1 * | 12/2009 | Scaletta | ............... | B25H 3/02 206/373 |
| 2010/0295430 A1 * | 11/2010 | Cheng | ............... | B25H 3/028 312/249.11 |
| 2013/0076005 A1 * | 3/2013 | McDade | ............... | B62B 1/20 280/418.1 |
| 2014/0375004 A1 * | 12/2014 | Adams | ............... | A47L 13/51 280/47.35 |

* cited by examiner

*Primary Examiner* — Hau V Phan
(74) *Attorney, Agent, or Firm* — Robert R. Lech; Lech Law, LLC

(57) ABSTRACT

The utility cart of the present application comprises a frame, and a plurality of wheels supported by the frame. In at least one embodiment, the frame comprises at least one wall which defines a recessed upper cavity, and a front cavity. The utility cart further comprises a plurality of parts boxes removably disposed within the front cavity; and a handle disposed in proximity to a bottom of the upper cavity and further disposed in proximity to a top of the front cavity.

15 Claims, 6 Drawing Sheets

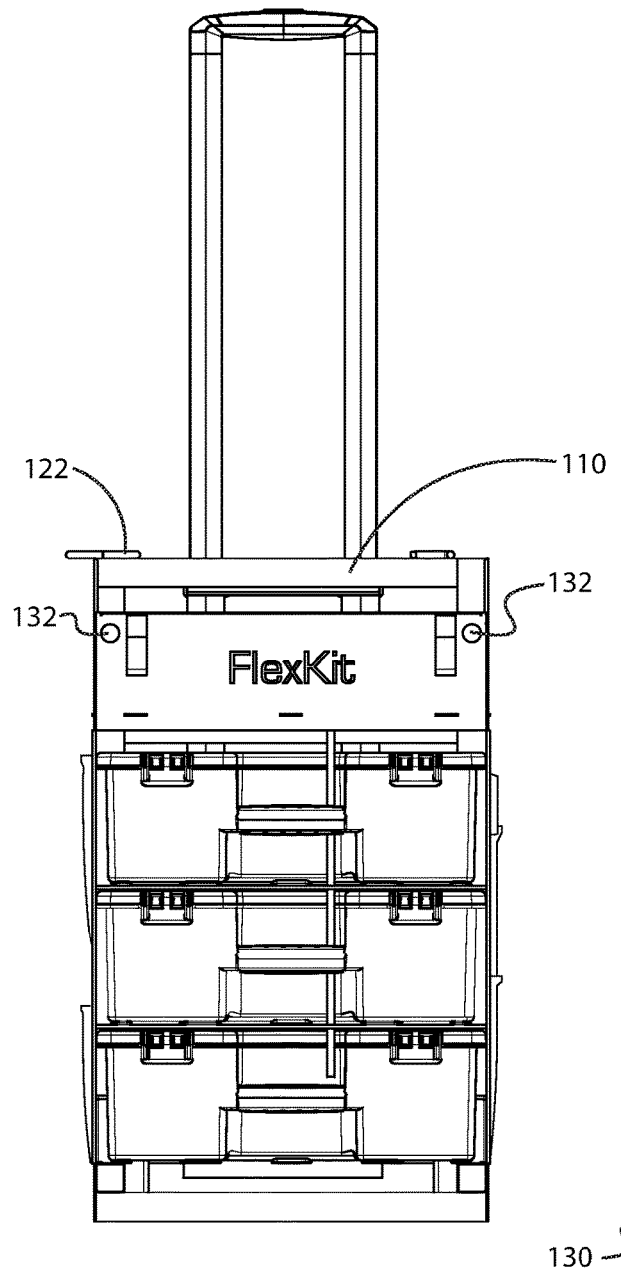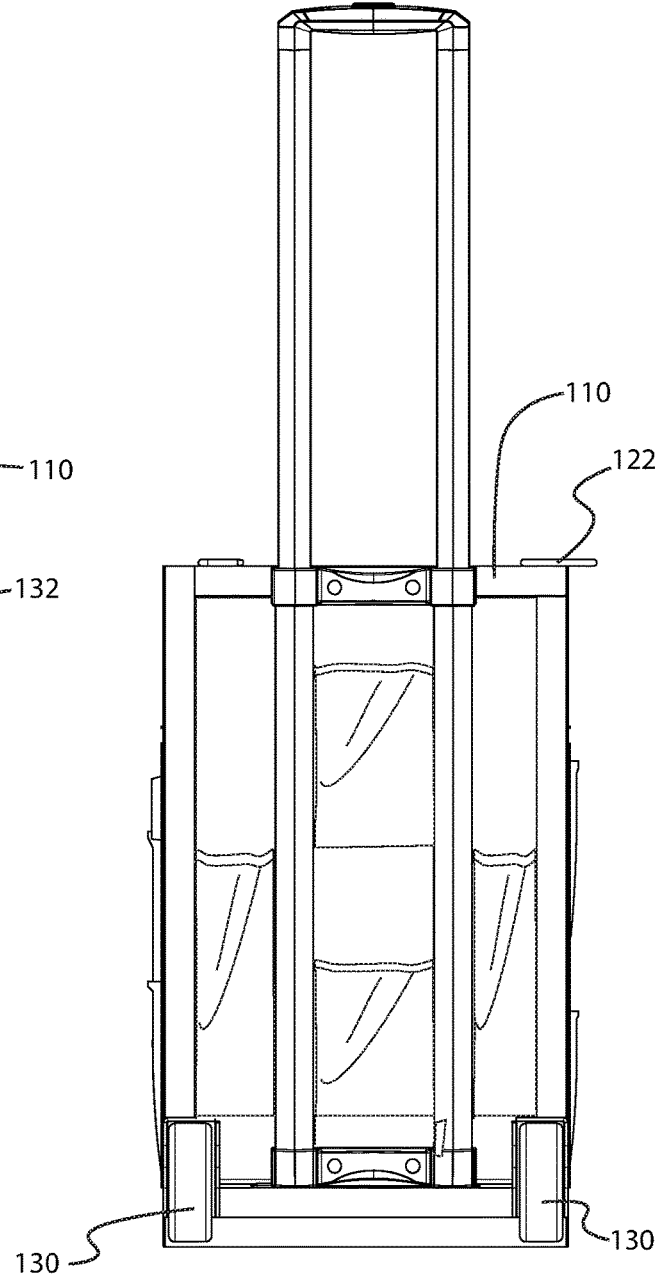
FIG. 3
FIG. 4

UTILITY CART

CROSS-REFERENCE TO RELATED APPLICATIONS

This application discloses subject matter also contained in a contemporaneously filed U.S. Design Patent Application, said application is hereby incorporated by reference in its entirety.

TECHNICAL FIELD

The present application generally relates to devices and methods for storing and transporting collections of items. More specifically, the present application relates to a utility cart having certain advantageous features.

BACKGROUND

Portable utility carts and cabinets are well known for storing and transporting a variety of items, such as audio/video equipment, tool sets and supplies for hotel service employees. Prior art utility carts are typically designed to carry items within the confines of the cart. A need therefore exists for a utility cart which can accommodate carrying a long-handled device, such as a plunger, for example. Additionally, a need exists for a cart that can be conveniently lifted in proximity to the center of gravity of the cart, when necessary.

SUMMARY

According to a first aspect of the present application, an example utility cart is disclosed. The first example cart comprises: a frame, the frame comprising: at least one wall defining a recessed upper cavity, and the at least one wall further defining a front cavity; a plurality of wheels supporting the frame; a plurality of parts boxes removably disposed within the front cavity; and a handle disposed in proximity to a bottom of the upper cavity and further disposed in proximity to a top of the front cavity.

BRIEF DESCRIPTION OF THE DRAWINGS

The accompanying figures, which are incorporated in and constitute a part of the specification, illustrate various example apparatuses, systems, methods, and so on, and are used merely to illustrate various example embodiments. It should be noted that various components depicted in the figures may not be drawn to scale, and that the various assemblies and designs depicted in the figures are presented for purposes of illustration only, and should not be considered in any way as limiting.

FIG. 3 illustrates a front view of the example utility cart of FIG. 1.

FIG. 4 illustrates a rear view of the example utility cart of FIG. 1.

DRAWING REFERENCE NUMERALS

Figure 1:
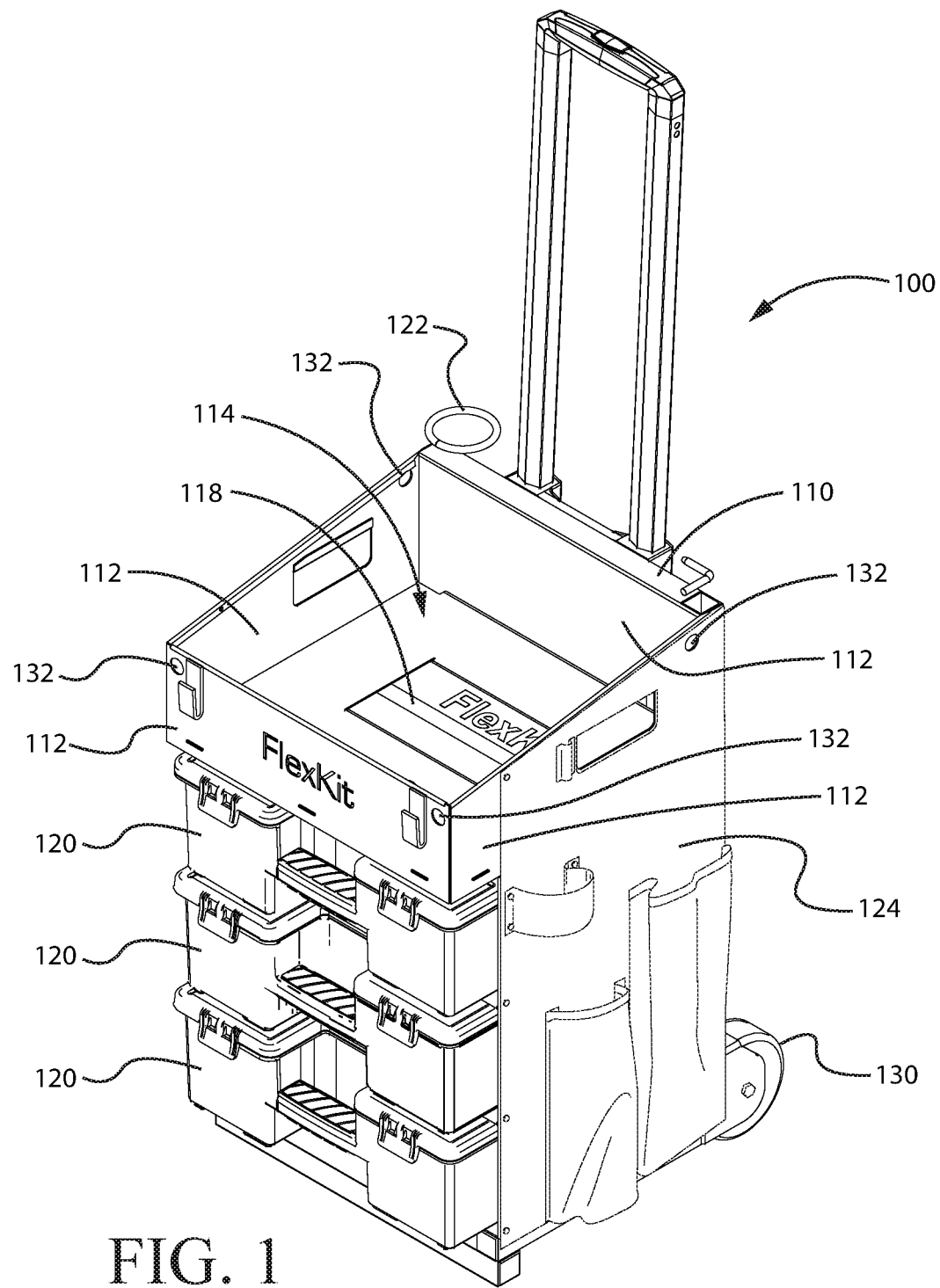
FIG. 1 illustrates an upper-front-right 3D view of an example utility cart.

The following reference characters identify the associated elements depicted in the drawings describing the present invention:

100 Cart
110 Frame
112 Wall
114 Upper Cavity
116 Front Cavity
118 Handle
120 Parts Box
122 Tool Holder
124 Fabric Covering
126 Sleeve
128 Plunger
130 Wheel
132 Lift Point

DETAILED DESCRIPTION

Figure 2:
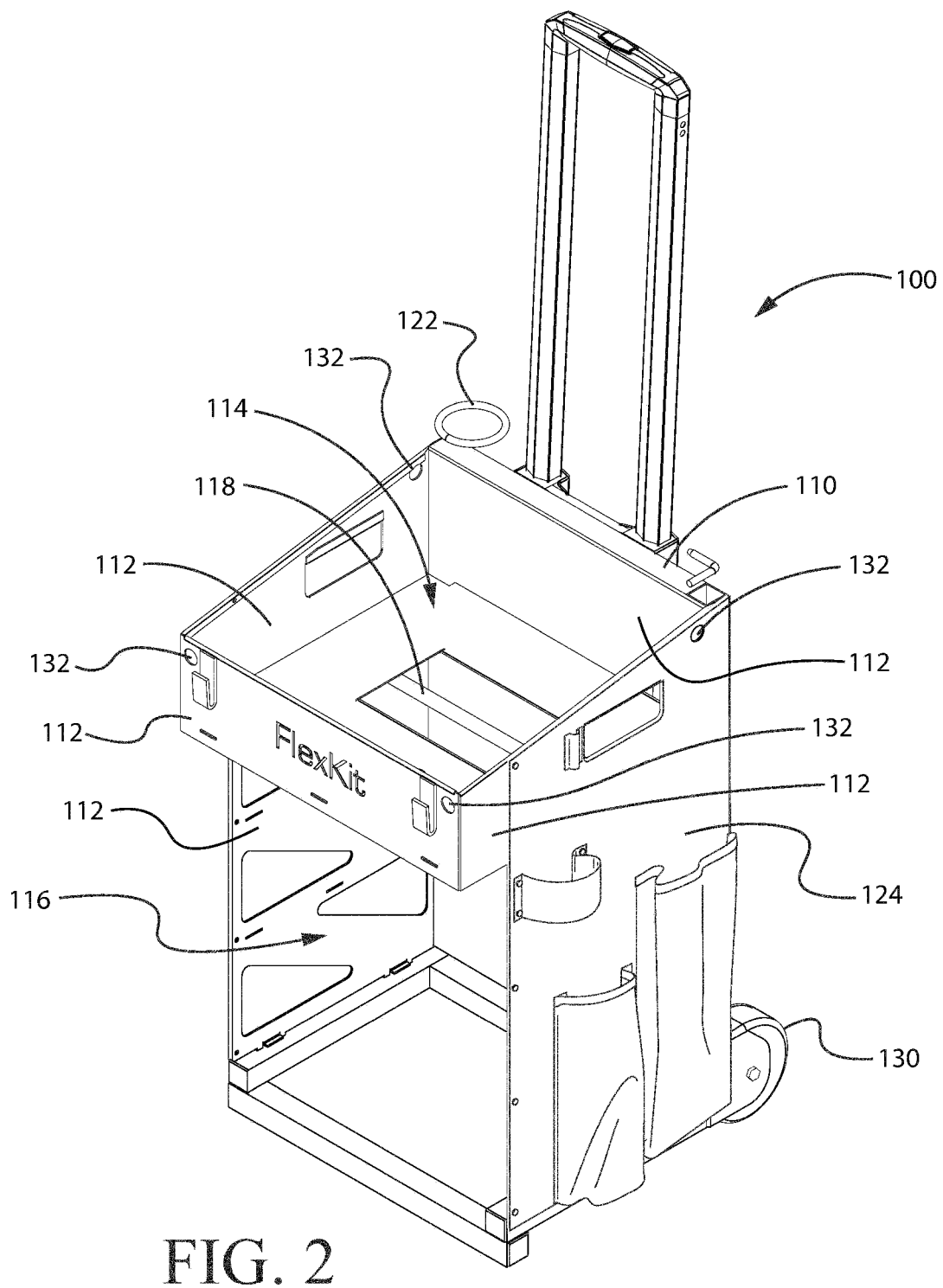
FIG. 2 illustrates an upper-front-right 3D view of the example utility cart of FIG. 1 with the drawers removed.
Figure 5:
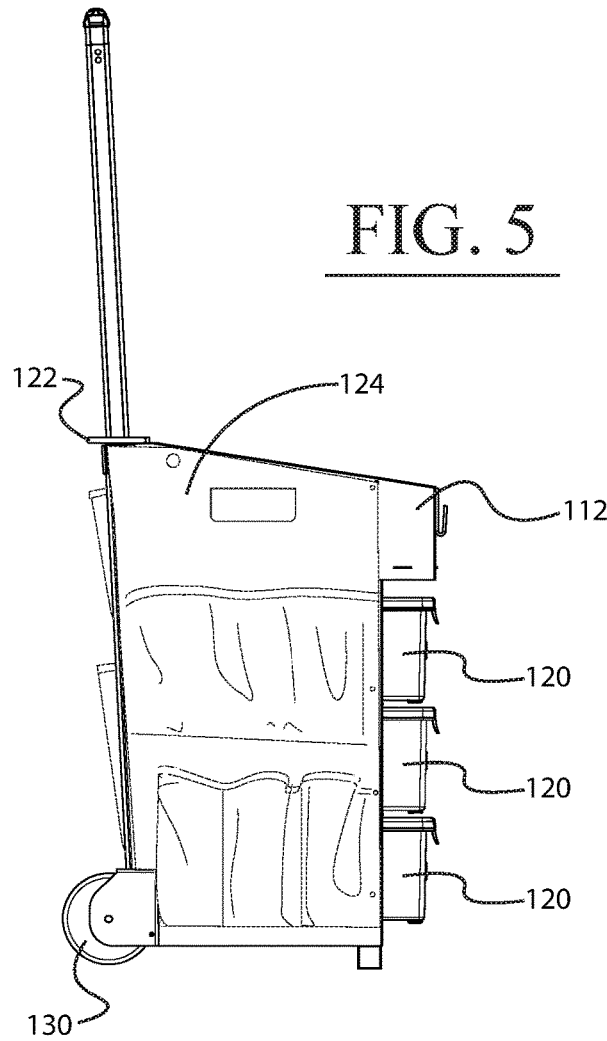
FIG. 5 illustrates a left side view of the example utility cart of FIG. 1.
Figure 6:
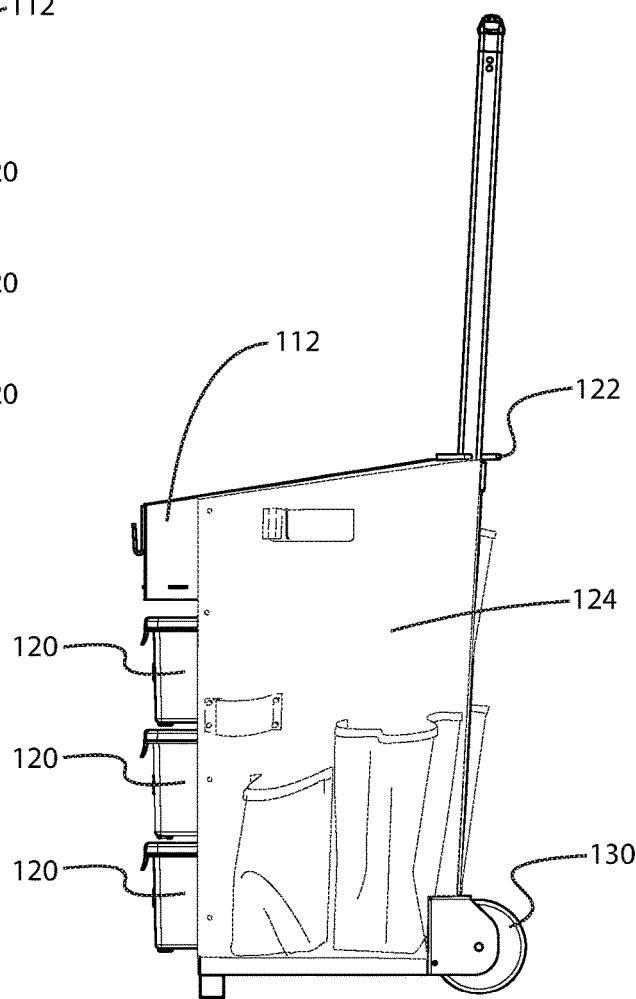
FIG. 6 illustrates a right side view of the example utility cart of FIG. 1.
Figure 7:
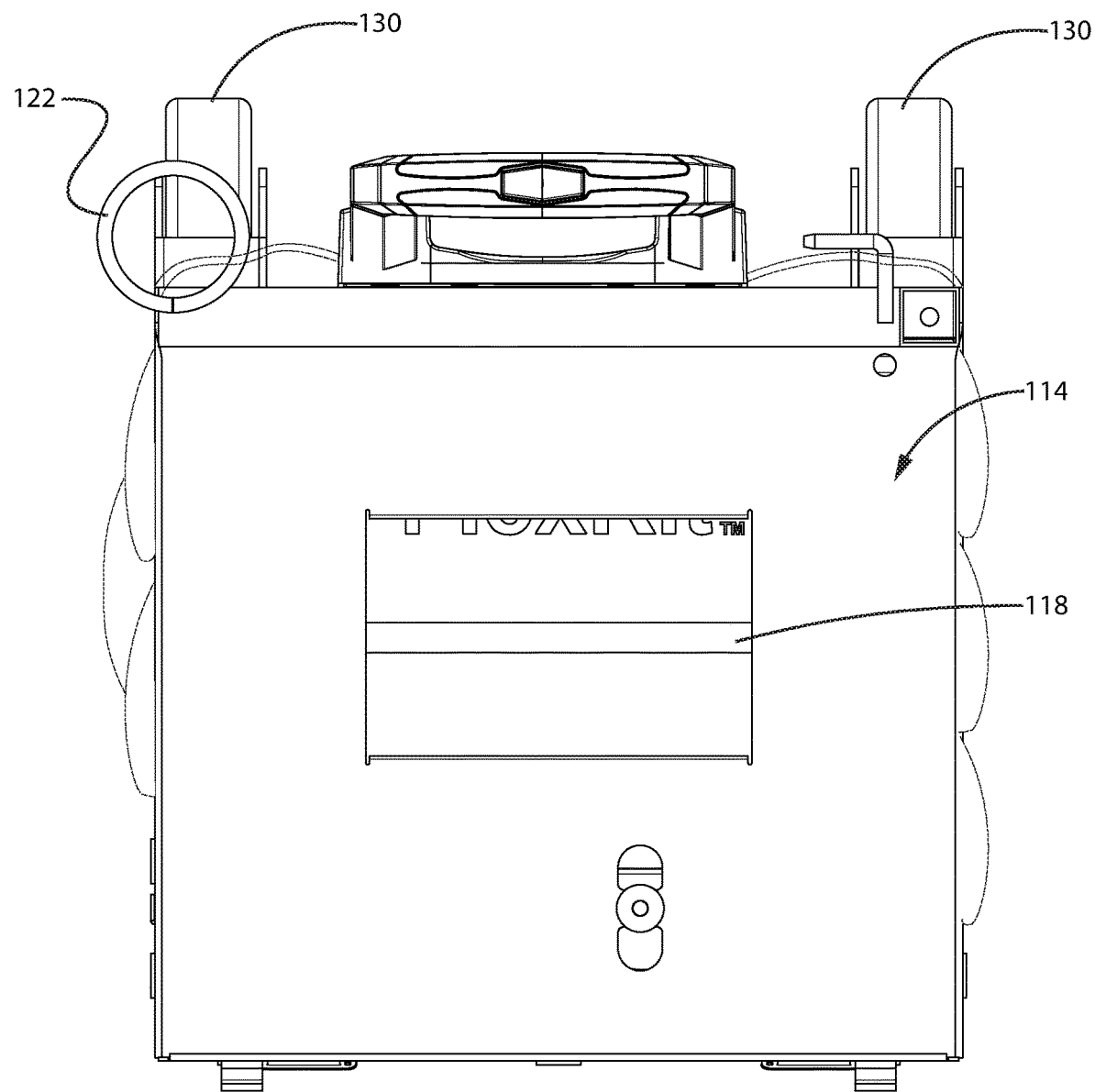
FIG. 7 illustrates a top view of the example utility cart of FIG. 1.
Figure 8:
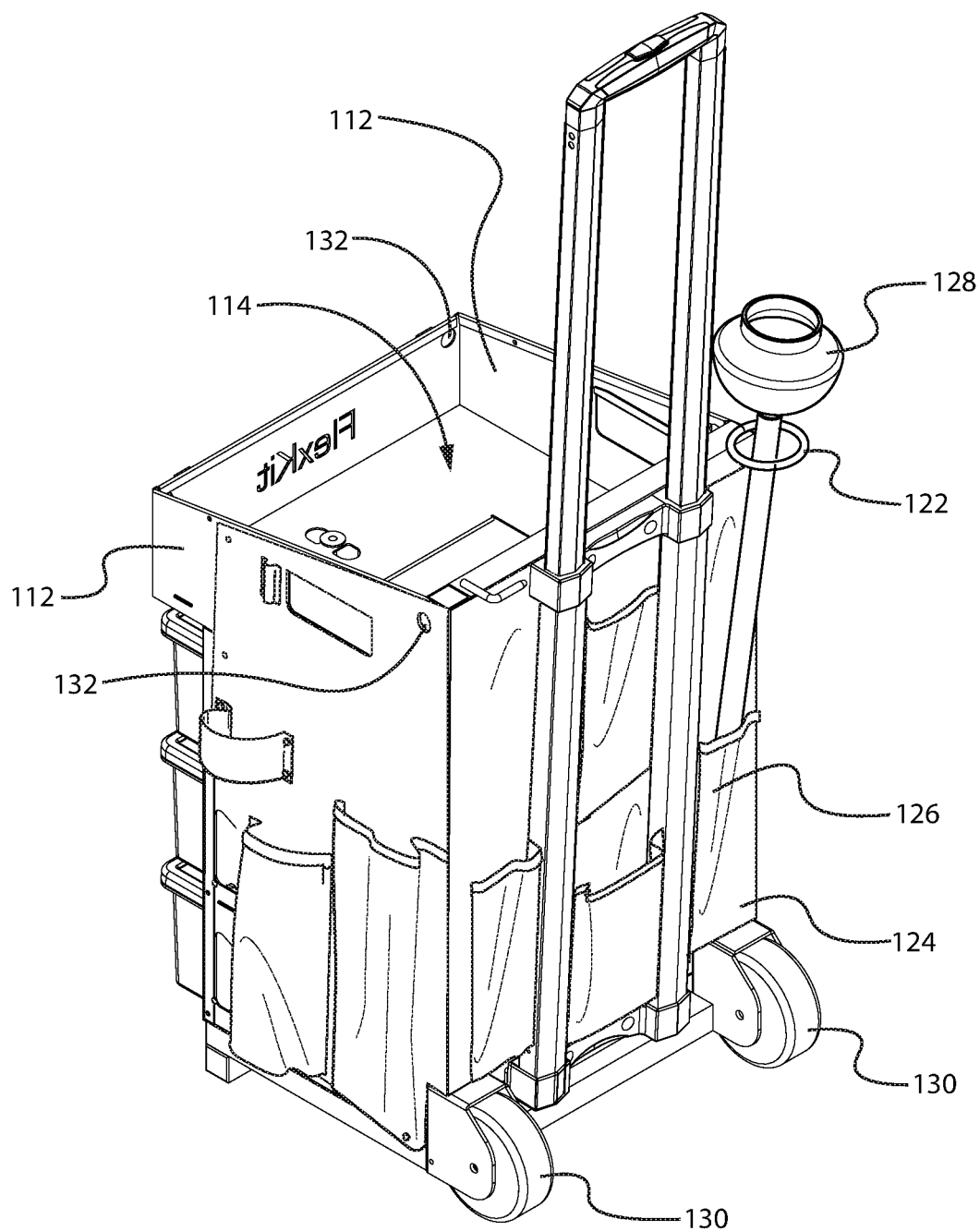
FIG. 8 illustrates an upper-rear-right 3D view of the example utility cart of FIG. 1 carrying a plunger.

FIGS. 1-8 illustrate various aspects of an example utility cart 100. As shown in FIGS. 1 and 2, cart 100 comprises a frame 110 and a plurality of rear wheels 130. Frame 110 comprises several walls 112 which define a plurality of cavities within cart 100 for storing items. Although the example embodiment employs a plurality of walls, a single, shaped wall could alternatively be employed to define one or more cavities within a cart. In the example embodiment, the walls 112 define, at least in part, an upper cavity 114 and a front cavity 116.

The upper cavity 114 is useful for holding a tool bag, tool box, loose parts, or other items that may be needed by the user of the cart. The front cavity 116 is also useful for storing items. Items may be secured in one or more parts boxes 120 which may be removably retained in the front cavity 116. The illustrated parts boxes 120 may be completely enclosed, preventing any stored items from accidentally falling from the cart 100. Of course, other parts boxes, drawers or other items may be stored in the front cavity 116.

As illustrated, the upper cavity 114 comprises four sides and a bottom. The front cavity comprises a top, bottom, back and two sides. In proximity to the bottom of the upper cavity and the top of the front cavity, cart 100 comprises a handle 118 which may be used to lift cart 100 in certain circumstances, such as in environments which are not conducive to other methods of transporting the cart, such as rolling using wheels 130. By placing the handle in proximity to the bottom of the upper cavity and the top of the front cavity, the handle is disposed closer to the center of gravity of the cart than if it were disposed toward the top of the upper cavity. Handle 118 is accessible by a user through an aperture in the bottom of the upper cavity.

In some instances, it may be useful to mechanically lift or suspend cart 100, without the direct control of a user. In order to facilitate such mechanical lifting or suspension, cart 100 comprises a plurality of lift points 132. As illustrated, lift points 132 comprise apertures formed in the walls 112 of cart 100 in proximity to the top of the upper cavity 114. Placing the lift points 132 at the upper portion of cart 100 enables the cart to be lifted and/or suspended without disturbing the contents of the cart, and without impeding use of the parts boxes 120 which may be stored in the front cavity 116. Lift points 132 may be equally spaced around the top portion of cart 100 to promote stability and balance.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Furthermore, while the devices, systems, methods, and so on have been illustrated by describing examples, and while the examples have been described in considerable detail, it is not the intention of the applicant to restrict, or in any way, limit the scope of the appended claims to such detail. It is, of course, not possible to describe every conceivable combination of components or methodologies for purposes of describing the devices, systems, methods, and so on provided herein. Additional advantages and modifications will readily appear to those skilled in the art. Therefore, the invention, in its broader aspects, is not limited to the specific details and illustrative examples shown and described. Accordingly, departures may be made from such details without departing from the spirit or scope of the applicant's general inventive concept. Thus, this application is intended to embrace alterations, modifications, and variations that fall within the scope of the appended claims. The preceding description is not meant to limit the scope of the invention. Rather, the scope of the invention is to be determined by the appended claims and their equivalents.

Finally, to the extent that the term "includes" or "including" is employed in the detailed description or the claims, it is intended to be inclusive in a manner similar to the term "comprising," as that term is interpreted when employed as a transitional word in a claim. Furthermore, to the extent that the term "or" is employed in the claims (e.g., A or B) it is intended to mean "A or B or both." When the applicants intend to indicate "only A or B, but not both," then the term "only A or B but not both" will be employed. Similarly, when the applicants intend to indicate "one and only one" of A, B, or C, the applicants will employ the phrase "one and only one." Thus, use of the term "or" herein is the inclusive, and not the exclusive use. See Bryan A. Garner, A Dictionary of Modern Legal Usage 624 (2d. Ed. 1995).

What is claimed is:

1. A cart comprising:
   a frame, the frame comprising:
   a recessed upper cavity, the upper cavity disposed toward a top of the frame, the upper cavity comprising four side walls and a bottom, the bottom forming an access aperture, and
   a front cavity, the front cavity disposed below the upper cavity, the front cavity comprising two side walls and a back wall;
   a plurality of wheels supporting the frame;
   a plurality of parts boxes removably disposed within the front cavity; and
   a rigid handle attached to the frame and disposed entirely below the bottom of the upper cavity and further disposed within the front cavity, the handle being accessible by a user through the access aperture.

2. The cart of claim 1 further comprising a tool holder attached to an exterior surface of the frame.

3. The cart of claim 2 further comprising a fabric covering disposed along thre exterior surface of the frame, the fabric covering comprising a vertical sleeve for receiving an elongated item, the sleeve aligned below the tool holder.

4. The cart of claim 1 further comprising a tool holder attached to an exterior surface of the frame, the tool holder comprising at least a portion of a ring defining a vertical aperture.

5. The cart of claim 4 further comprising a fabric covering disposed along the exterior surface of the frame, the fabric covering comprising a vertical sleeve for receiving an elongated item, the sleeve aligned below the tool holder.

6. The cart of claim 5 further comprising a plunger disposed in the tool holder and sleeve.

7. The cart of claim 1 further comprising a fabric covering disposed along an exterior surface of the frame, the fabric covering comprising a vertical sleeve for receiving an elongated item.

8. The cart of claim 1 wherein the at least one wall forms a plurality of apertures which are structurally sufficient to function as lift points.

9. The cart of claim 1 further comprising a plurality of lift elements attached to an exterior surface of the frame.

10. The cart of claim 9 wherein the plurality of lift elements comprise a plurality of D-rings.

11. The cart of claim 1 wherein the bottom of the upper cavity forms an aperture exposing the handle disposed below.

12. A cart comprising:
    a frame, the frame comprising:
    a recessed upper cavity, the upper cavity disposed toward a top of the frame, the upper cavity comprising four side walls and a bottom, the bottom forming an access aperture,
    a plurality of apertures formed by the frame structurally sufficient to function as lift points, and
    a front cavity, the front cavity disposed below the upper cavity, the front cavity comprising two side walls and a back wall;
    a tool holder attached to an exterior surface of the frame, the tool holder comprising at least a portion of a ring defining a vertical aperture;
    a fabric covering disposed along the exterior surface of the frame, the fabric covering comprising a vertical sleeve for receiving an elongated item, the sleeve aligned below the tool holder;
    a plurality of wheels supporting the frame;
    a plurality of parts boxes removably disposed within the front cavity;
    a rigid handle attached to the frame and disposed entirely below the bottom of the upper cavity and further disposed within the front cavity, the handle being accessible by a user through the access aperture.

13. The cart of claim 12 wherein the bottom of the upper cavity forms an aperture exposing the handle disposed below.

14. A cart comprising:
    a frame, the frame comprising:
    a recessed upper cavity, the upper cavity disposed toward a top of the frame, the upper cavity comprising four side walls and a bottom, and
    a front cavity, the front cavity disposed below the upper cavity, the front cavity comprising two side walls and a back wall;
    a tool holder attached to an exterior surface of the frame, the tool holder comprising at least a portion of a ring defining a vertical aperture;
    a fabric covering disposed along the exterior surface of the frame, the fabric covering comprising a vertical sleeve for receiving an elongated item, the sleeve aligned below the tool holder;

a plurality of D-rings attached to the exterior surface of the frame;
a plurality of wheels supporting the frame;
a plurality of parts boxes removably disposed within the front cavity;
a rigid handle attached to the frame and disposed entirely below the bottom of the upper cavity and further disposed within the front cavity.

15. The cart of claim 14 wherein the bottom of the upper cavity forms an aperture exposing the handle disposed below.

\* \* \* \* \*